US005345167A

United States Patent [19]

Hasegawa et al.

[11] Patent Number: 5,345,167

[45] Date of Patent: Sep. 6, 1994

[54] AUTOMATICALLY ADJUSTING DRIVE CIRCUIT FOR LIGHT EMITTING DIODE

[75] Inventors: Kazuo Hasegawa, Furukawa; Shin Sugifune, Sendai, both of Japan

[73] Assignee: Alps Electric Co., Ltd., Tokyo, Japan

[21] Appl. No.: 56,109

[22] Filed: May 3, 1993

[30] Foreign Application Priority Data

May 26, 1992 [JP] Japan ................................ 4-133763

[51] Int. Cl.[5] ......................... G05F 1/56; G05B 24/02

[52] U.S. Cl. ..................................... 323/349; 323/902

[58] Field of Search ............... 323/349, 265, 273, 274, 323/277, 902; 340/425, 826, 827; 359/174; 250/205; 372/31; 307/547, 553, 562; G05F 1/56

[56] References Cited

U.S. PATENT DOCUMENTS

| | | | |
|---|---|---|---|
| 3,188,493 | 6/1965 | Malagari | 307/553 X |
| 3,243,604 | 3/1966 | Johnson | 307/547 X |
| 3,952,242 | 4/1976 | Ukai | 323/902 X |
| 4,179,666 | 12/1979 | Lindenborg | 323/274 X |
| 4,190,795 | 2/1980 | Schultheis | 323/902 X |
| 4,203,032 | 5/1980 | Haunstetter et al. | 250/205 |
| 4,395,660 | 7/1983 | Waszkiewicz | 323/902 X |
| 4,716,285 | 12/1987 | Konishi | 250/205 |
| 4,733,398 | 3/1988 | Shibagaki et al. | 250/205 X |
| 4,998,043 | 3/1991 | Unami et al. | 250/205 X |
| 5,144,117 | 9/1992 | Hasegawa et al. | 323/269 X |

*Primary Examiner*—Steven L. Stephan
*Assistant Examiner*—E. To
*Attorney, Agent, or Firm*—Guy W. Shoup; Patrick T. Bever

[57] ABSTRACT

A light emitting diode driving circuit for supplying a driving pulse to a light emitting diode to thereby cause the light emitting diode to intermittently emit light is disclosed which comprises a clamping circuit, a photodiode disposed in the vicinity of the light emitting diode for detecting the optical output power of the light emitting diode, an AC amplifier having its DC operating point stabilized by means of a DC feedback circuit for AC amplifying the detected output from the photodiode, a shaping circuit for shaping the output amplified signal from the AC amplifier, and a comparison circuit for comparing for voltage the output shaped signal from the shaping circuit and a reference voltage, in which the clamping voltage of the clamping circuit is controlled by the output of the comparison circuit and, thereby, the optical output power of the light emitting diode is maintained constant.

10 Claims, 9 Drawing Sheets

AUTOMATICALLY ADJUSTING DRIVE CIRCUIT FOR LIGHT EMITTING DIODE

BACKGROUND OF THE INVENTION

1. Field of the Invention

The present invention relates to a light emitting diode driving circuit for use in a photoelectric switch apparatus or the like and, more particularly, to a light emitting diode driving circuit detecting the optical output power of a light emitting diode and using the detected output for regulating the clamping voltage of a clamping circuit, thereby automatically controlling driving power of the light emitting diode.

2. Description of the Related Art

In a photoelectric switch apparatus for detecting a transported object on a conveyer belt, it is conventionally arranged such that plural sets of light emitting diodes and photodiodes are arranged along the conveyer belt at intervals of a suitable distance, the light emitting diodes are caused to emit light intermittently at the timing in agreement with the timing of the transportation of the object, and the reflected light from the transported object is detected by the respective corresponding photodiodes of the light emitting diodes, and it is thereby possible to detect presence or absence of the transported object. At this time, while the light emitting diode is intermittently driven by a driving pulse with a rectangular waveform generated by a timing circuit, the driving pulse is arranged to be supplied to the light emitting diode through a light emitting diode driving circuit.

FIG. 9 is a block diagram showing an example of a conventional photoelectric switch apparatus.

Referring to FIG. 9, reference numeral 50 denotes a photodiode, 51 denotes a preamplifier, 52 denotes a low-pass filter, 53 denotes an amplifier, 54 denotes a limiter amplifier, 55 denotes a detector circuit, 56 denotes a binarization circuit, 57 denotes a microcomputer, 58 denotes a light emitting diode, and 59 denotes a driving transistor.

Further, there is disposed a conveyer belt (not shown) between the photodiode 50 and the light emitting diode 58, and, on the conveyer belt, the transported objects are transported with a suitable distance therebetween.

In the above described arrangement, a timing circuit (not shown) incorporated in the microcomputer 57 generates a driving pulse with a rectangular waveform at the timing of the transported object passing close by one of the light emitting diodes 58. The driving pulse is supplied to the light emitting diode 58 through the light emitting diode driving circuit, so that the light emitting diode 58 emits light every time the transported object passes close by it and throws the optical output power on the transported object. The reflected light from the transported object is detected by the photodiode 50 and a detected signal corresponding to the intensity of the reflected light is output therefrom. Then, the detected signal is amplified to a predetermined level by the preamplifier 51, deprived of unnecessary components by the low-pass filter 52, and amplified at high gain by the amplifier 53. Then, the amplified detected signal is subjected to limiting and amplifying processing in the limiter amplifier 54 such that one of the polarities is chiefly amplified, e.g., a positive half-wave component is amplified, and then subjected to detection in the detector circuit 55 such that the envelope of the signal component is detected. The envelope signal is converted into a binary signal by the binarization circuit 56 and supplied to the microcomputer 57. The microcomputer 57 makes decision as to presence or absence of the transported object on the basis of the binary signal.

In such a light emitting diode driving circuit for use in a photoelectric switch apparatus or the like, the optical output power of the light emitting diode 58 tends to gradually attenuate by the effect of changes in the ambient temperature, age deterioration, and the like, even if there is no change in the power of the driving pulse supplied to the light emitting diode 58. The attenuation of the optical output power causes attenuation of the reflected light from the transported object accompanied by lowering of the signal level of the detected signal from the photodiode 50. When the signal level of the detected signal lowers, there arises a problem that the processing of the detected signal becomes difficult, especially the decision as to presence or absence of the transported object according to the binary signal obtained by the binarization process becomes substantially difficult, and consequently it occurs that erroneous decision is made as to presence or absence of the transported object.

SUMMARY OF THE INVENTION

The present invention has been made to overcome the above described problem. Accordingly, a primary object of the present invention is to provide a light emitting diode driving circuit detecting changes in the optical output power of a light emitting diode due to changes in the ambient temperature, age deterioration, and the like, to thereby achieve automatic regulation of the optical output power to keep it at a constant level.

Another object of the present invention is to provide a light emitting diode driving circuit which, in an automatic adjustment of the optical output power of a light emitting diode, is possible to achieve the automatic adjustment even if the duty cycle or average value of a detected signal of the optical output power varies.

In order to achieve the above primary object, the present invention, in a light emitting diode driving circuit for supplying a driving pulse from a drive power source to a light emitting diode to thereby cause the light emitting diode to emit light intermittently, has a first means comprised of a clamping circuit provided between the drive power source and the light emitting diode, a photodiode disposed in the vicinity of the light emitting diode for detecting the optical output power of the light emitting diode, and a comparison circuit for comparing for voltage the detected output from the photodiode and a reference voltage, in which the clamping voltage of the clamping circuit is controlled by the output of the comparison circuit and, thereby, the optical output power of the light emitting diode is kept constant.

In order to achieve the above primary object and another object, the present invention, in a light emitting diode driving circuit for supplying a driving pulse from a drive power source to a light emitting diode to thereby cause the light emitting diode to emit light intermittently, has a second means comprised of a clamping circuit provided between the drive power source and the light emitting diode, a photodiode disposed in the vicinity of the light emitting diode for detecting the optical output power of the light emitting diode, an AC amplifier having its DC operating point stabilized by means of a DC feedback circuit for AC amplifying the detected output from the photodiode, a shaping circuit for shaping the output amplified signal from the AC amplifier, and a comparison circuit for comparing for voltage the output shaped signal from the shaping circuit and a reference voltage, in which the clamping voltage of the clamping circuit is controlled by the output of the comparison circuit and, thereby, the optical output power of the light emitting diode is kept constant.

According to the above described first means, the optical output power of the light emitting diode is constantly detected by the photodiode disposed in the vicinity of the light emitting diode and the photodiode generates the detected signal with an amplitude corresponding to the optical output power. The detected signal is amplified and shaped for waveform in a signal processing circuit to be converted into an amplified and shaped signal and then supplied to the comparison circuit. In the comparison circuit, the amplified and shaped signal is compared for voltage with a reference voltage and the comparison output is supplied to the clamping circuit, so that the clamping voltage of the clamping circuit is changed. When the optical output power of the light emitting diode is lowered from a specified optical output power because of changes in the characteristics due to age deterioration, temperature variation, or the like, the clamping voltage of the clamping circuit is adapted to be increased by the supply of the comparison output. Accordingly, the amplitude of the driving pulse supplied to the light emitting diode is increased and, as a result, automatic regulation is achieved to maintain the optical output power of the light emitting diode at a predetermined level.

According to the above described second means, since the AC amplifier whose DC operating point is stabilized by means of the DC feedback circuit is used in the amplification of the detected signal in the signal processing circuit, such a performance, in addition to the performance achieved in the first means, is achieved therein that even when the duty cycle of the detected signal is small or the average value of the detected signal varies with time, an output amplified signal accurately corresponding to the variation in the amplitude of the detected signal is generated.

DESCRIPTION OF THE PREFERRED EMBODIMENTS

An embodiment of the present invention will be described below with reference to the accompanying drawings.

Figure 1:
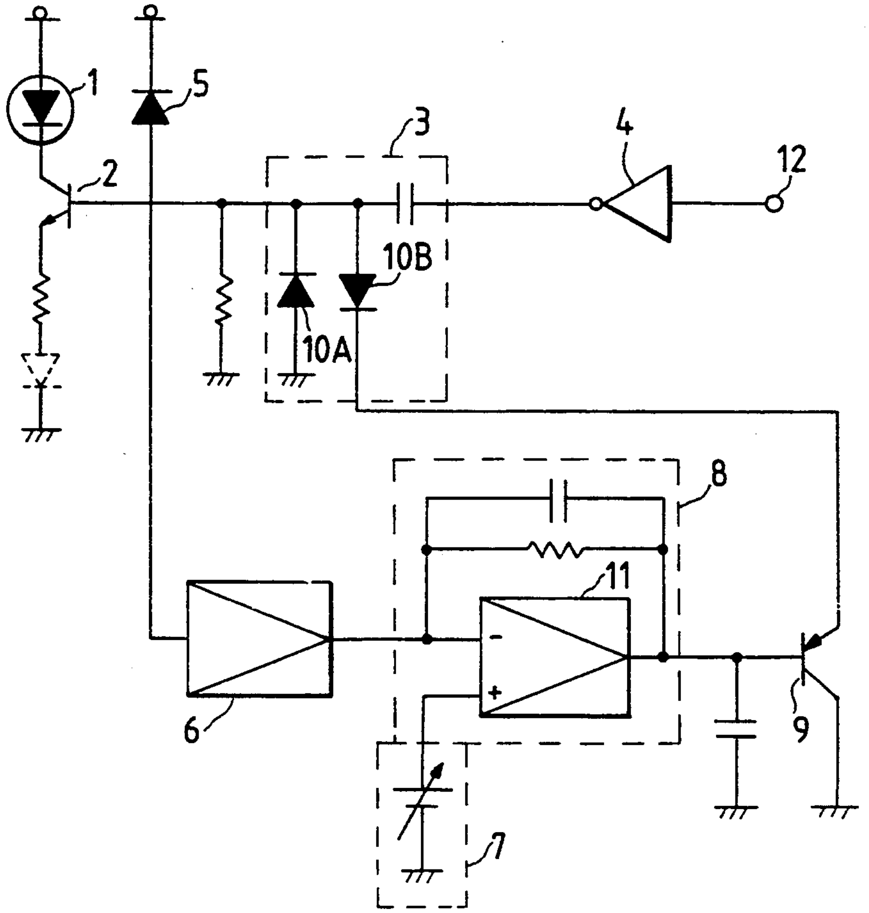
FIG. 1 is a circuit block diagram showing a first embodiment of a light emitting diode driving circuit according to the present invention.

FIG. 1 is a circuit block diagram showing a first embodiment of a light emitting diode driving circuit according to the present invention.

Referring to FIG. 1, reference numeral 1 denotes a light emitting diode (LED), 2 denotes a LED driving transistor, 3 denotes a clamping circuit, 4 denotes an inverter circuit, 5 denotes a monitoring photodiode, 6 denotes an AC amplifier having a nonlinear detecting characteristic, 7 denotes a reference power supply, 8 denotes a comparison circuit, 9 denotes a clamping voltage setting transistor, 10A and 10B denote clamping diodes, 11 denotes an operational amplifier, and 12 denotes a driving pulse supply terminal.

The light emitting diode 1 is connected with the collector of the LED driving transistor 2 and the base of the LED driving transistor 2 is connected with the driving pulse supply terminal 12 through the clamping circuit 3 and the inverter circuit 4. The clamping circuit 3 includes the two clamping diodes 10A and 10B in a shunt connection. The other end of one diode 10A is grounded and the other end of the other diode 10B is connected with the emitter of the clamping voltage setting transistor 9. The monitoring photodiode 5 is disposed in the vicinity of the light emitting diode 1 so that a portion of the optical output power of the light emitting diode 1 may be directly supplied thereto. The comparison circuit 8 includes the operational amplifier 11. One of the inputs of the operational amplifier 11 is connected with the monitoring photodiode 5 through the AC amplifier 6 and the other input is connected with the reference power supply 7, while the output of the operational amplifier 11 is connected to the base of the clamping voltage setting transistor 9.

Figure 2:
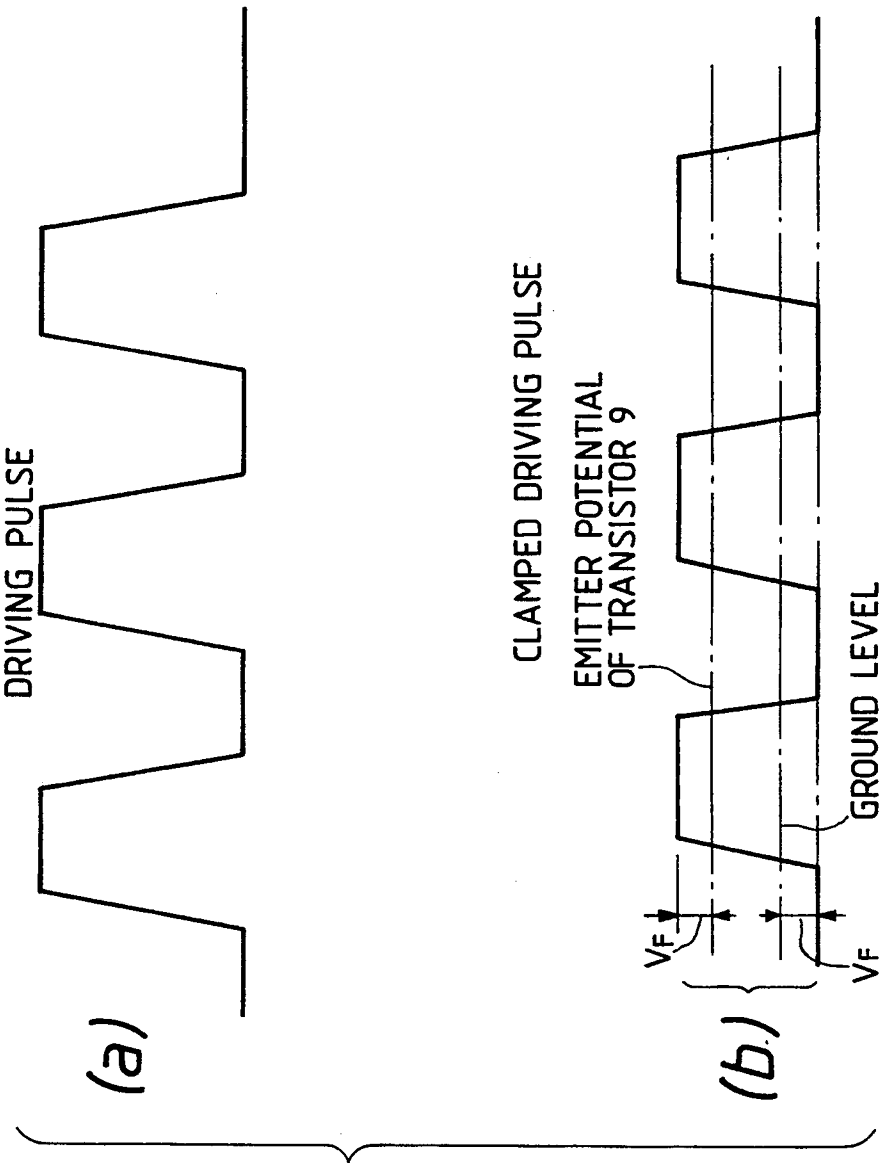
FIGS. 2*a* and 2*b* are a waveform chart showing a driving pulse before clamping and after clamping in the first embodiment.

FIG. 2 shows waveform charts of a driving pulse used in the embodiment of FIG. 1. FIG. 2(*a*) shows the waveform of the driving pulse at the point A before clamping and FIG. 2(*b*) shows the waveform of the driving pulse at the point B after clamping.

The operation of the present embodiment will be described below with reference to FIG. 1 and FIG. 2.

A rectangular-wave driving pulse of negative polarity is generated by a driving source (not shown) in a microcomputer or the like, and this driving pulse is supplied to the driving pulse supply terminal 12. The driving pulse is inverted in the inverter circuit 4 and converted into the driving pulse of positive polarity as shown in FIG. 2(*a*). The driving pulse of positive polarity is then supplied to the clamping circuit 3. The clamping circuit 3 is adapted to have its first clamping potential set at −Vf obtainable by subtracting the forward voltage drop Vf (approximately 0.6 V) of the diode 10A from the ground potential and its second clamping potential set at the potential obtainable by adding the forward voltage drop Vf (approximately 0.6 V) of the diode 10B to the emitter potential of the clamping voltage setting transistor 9. Accordingly, the driving pulse of positive polarity is converted to a clamped driving pulse, of which the base value is clamped to the first clamping potential and the peak value is clamped to the second clamping potential, as shown in FIG. 2(*b*). Then, the clamped driving pulse is supplied to the base of the LED driving transistor 2. The LED driving transistor 2 drives the light emitting diode 1 connected to its collector only while the second clamped voltage of the clamped driving pulse is supplied to the same and causes the light emitting diode 1 to generate an intermittent optical output power. The timing of generation of the rectangular-wave driving pulse of negative polarity is so set that the light emitting timing of the light emitting diode 1 coincides with the timing of approach of a transported object (not shown) to the light emitting diode 1.

Incidentally, since the peak value of the clamped driving pulse supplied to the base of the LED driving transistor 2 has its peak value set to be higher than the emitter potential of the clamping voltage setting transistor 9 by the voltage drop Vf (approximately 0.6 V), when it is attempted to reduce the optical output power of the light emitting diode 1, sometimes a difficulty arises in the adjustment of the optical output power because the collector current of the LED driving transistor 2 cannot be decreased so much. In such case, it may be practiced to insert a diode for level shifting in the emitter circuit of the LED driving transistor 2 as indicated by broken lines in FIG. 1 to thereby cancel out the portion corresponding to the voltage drop Vf (approximately 0.6 V) of the peak value of the clamped driving pulse.

Then, the optical output power of the light emitting diode 1 is applied to the transported object and also supplied to the monitoring photodiode 5 disposed in the vicinity of the light emitting diode 1. At this time, the monitoring photodiode 5 generates a detected signal whose amplitude is correspondent to the radiant power supplied thereto from the light emitting diode 1. This detected signal is amplified by the AC amplifier 6 to a suitable level and supplied to the inverting input terminal of the operational amplifier 11 in the comparison circuit 8. In the comparison circuit 8, the input detected signal is integrated by the operational amplifier 11 and a parallel circuit of a resistor and a capacitor connected in the negative feedback path of the operational amplifier 11 and, thereby, an average voltage proportional to the average value of the detected signal is obtained. This average voltage is compared with the reference voltage supplied to the noninverting input terminal of the operational amplifier 11 from the reference power supply 7, so that a difference voltage between the average voltage and the reference voltage is obtained at the output of the operational amplifier 11. This difference voltage is supplied to the base of the clamping voltage setting transistor 9 so that the second clamping voltage produced at the emitter of the clamping voltage setting transistor 9 may be varied.

At this time, when the value of the optical output power of the light emitting diode 1 has become lower than a normal set value and the amplitude of the detected signal has become smaller than its normal value, the above second clamping voltage is controlled to assume a higher value so that the peak value of the clamped driving pulse is raised and the value of the optical output power is increased accordingly. On the other hand, when the value of the optical output power of the light emitting diode 1 has become higher than the normal set value and the value of the amplitude of the detected signal has becomes larger than its normal value, the clamping voltage is controlled to assume a lower value, so that the peak value of the clamped driving pulse is lowered and the value of the optical output power is decreased accordingly. Through such sequences of controlling operations, the value of the optical output power of the light emitting diode 1 is automatically controlled to be kept constant at all times.

Although it is arranged in the present embodiment such that the peak value of the clamped driving pulse becomes the second clamped voltage (the potential obtained by adding the forward voltage drop Vf of the diode 10B to the emitter potential of the clamping voltage setting transistor 9), by inserting the diode indicated by broken lines in FIG. 1 in the emitter circuit of the LED driving transistor 2 in the forward direction as described above, the peak value of the clamped driving pulse can be brought into agreement with the emitter potential of the clamping voltage setting transistor 9.

According to the present embodiment as described above, even if the value of the optical output power of the light emitting diode 1 varies on account of age deterioration, changes in the characteristics due to temperature variation, etc., it is arranged such that the variation in the value of the optical output power is detected and the second clamping voltage is controlled in accordance with such a variation. Therefore, the variation in the optical output power is canceled and it is made possible to have a constant value of the optical output power generated by the light emitting diode 1 at all times. Because of the above merit of the arrangement capable of having a constant value of the optical output power generated from the light emitting diode 1 at all times, when the light emitting diode driving circuit according to the present embodiment is applied to such an apparatus as a photoelectric switch apparatus for detecting a transported object, presence or absence of the transported object can be accurately detected irrespective of variations in environmental conditions.

It may be possible to arrange in the present embodiment to eliminate the AC amplifier 6 from the circuit such that the output of the monitoring photodiode 5 is directly input to the operational amplifier 11 of the comparison circuit 8. In such case, however, there arises a possibility that an accurate detected output cannot be provided to the comparison circuit 8 when light producing a strong direct current (such as sunlight) is detected by the monitoring photodiode 5.

Figure 3:
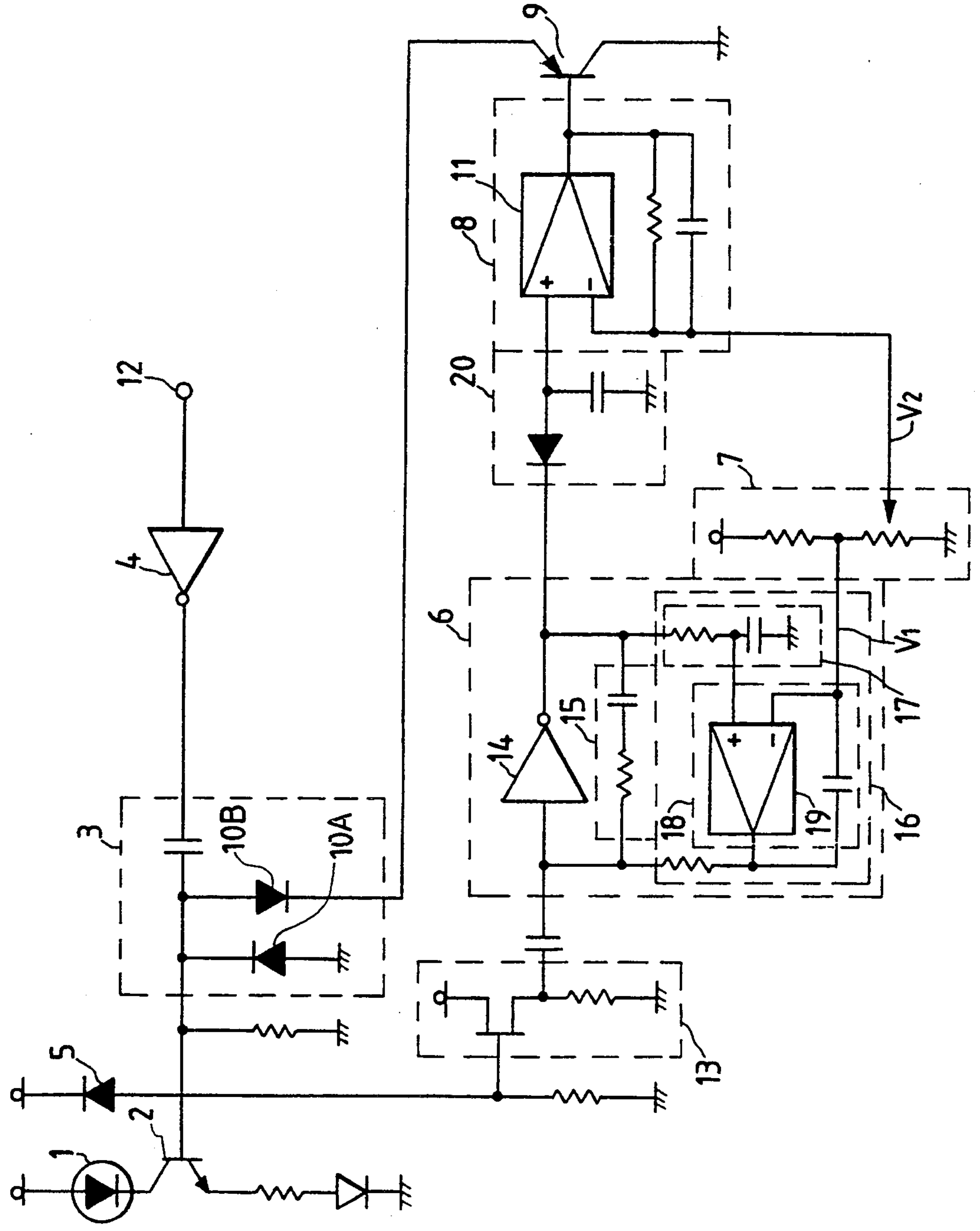
FIG. 3 is a circuit block diagram showing a second embodiment of the light emitting diode driving circuit according to the present invention.

FIG. 3 is a circuit block diagram showing a second embodiment of a light emitting diode driving circuit according to the present invention.

Referring to FIG. 3, reference numeral 13 denotes a buffer amplifier, 14 denotes a DC coupled inverting amplifier, 15 denotes an AC feedback circuit, 16 denotes a DC feedback circuit, 17 denotes an operating point extractor circuit, 18 denotes a bias voltage generator circuit, 19 denotes an operational amplifier, and 20 denotes a detector circuit. Component parts corresponding to those in FIG. 1 are denoted by like reference numerals.

The AC amplifier 6 is made up of the DC coupled inverting amplifier 14, which is formed for example of three directly coupled transistor amplifying stages and has no separate DC bias supply circuit for each stage therein, and the AC feedback circuit 15 and the DC feedback circuit 16 connected in parallel between the input and output terminals of the DC coupled inverting amplifier 14. The DC feedback circuit 16 includes the operating point extractor circuit 17 and the bias voltage generator circuit 18. The operating point extractor circuit 17 is constituted of a low-pass filter circuit and the bias voltage generator circuit 18 is constituted of the operational amplifier 19, a negative feedback capacitor, and a feedback resistor in series connection. The DC coupled inverting amplifier 14 is connected at its input with the monitoring photodiode 5 through the buffer amplifier 13 including a field-effect transistor of a source-follower connection and connected at its output with an input of the operational amplifier 11 of the comparison circuit 8 through the detector circuit 20 including a diode.

The present embodiment differs from the first embodiment chiefly in that the AC amplifier 6 in the present embodiment is of the structure as described above while the AC amplifier 6 used in the first embodiment was that of an ordinary structure. First, the function which the AC amplifier 6 in the present embodiment has and the operation of the same will be described.

First, when no signal is supplied (when the detected signal is not input) to the input terminal of the AC amplifier 6, the input terminal of the DC coupled inverting amplifier 14 is supplied with the DC bias voltage from the bias voltage generator circuit 18. More specifically, a voltage $V_1$ obtained from the reference power supply 7 is supplied, through the operational amplifier 19 of the bias voltage generator circuit 18, to the input terminal of the DC coupled inverting amplifier 14, and the operating point of the transistor in each amplifying stage of the DC coupled inverting amplifier 14 is selectively set so as to become the reference level agreeing with the voltage $V_1$.

Thereafter, when the detected signal is input to the input terminal of the AC amplifier 6, the detected signal is amplified with high gain by the DC coupled inverting amplifier 14 and the output detected signal having the voltage $V_1$ as the reference level is obtained at the output terminal of the same. The output detected signal is supplied to the subsequent detector circuit 20. At this time, a portion of the output detected signal is, on the one hand, negatively fed back to the input terminal of the DC coupled inverting amplifier 14 through the AC feedback circuit 15 and, on the other hand, negatively fed back similarly to the input terminal of the DC coupled inverting amplifier 14 through the DC feedback circuit 16.

In this case, in the DC feedback circuit 16, the output detected signal is first supplied to the operating point extractor circuit 17 constituted of a low-pass filter and, therein, the DC and extremely low frequency component (which will hereinafter be called "DC component") is extracted from the output detected signal and supplied to the noninverting input terminal of the operational amplifier 19. Meanwhile, the inverting input terminal of the operational amplifier 19 is supplied with the voltage $V_1$ from the reference power supply 7 and, accordingly, the DC component and the voltage $V_1$ are compared for level in the operational amplifier 19 and thus the comparison output voltage of them is obtained at the output of the operational amplifier 19. Then, this comparison output voltage is supplied to the input terminal of the DC coupled inverting amplifier 14 through the feedback resistor connected in series. Thus, a function of compensating for the variation of the output detected signal from the reference level (identical to the voltage $V_1$) is performed.

Detailed description of the above performance will be given below. Even if the DC operating point of each of the amplifying stages of the DC coupled inverting amplifier 14 deviates from the preset value for some reason or other, and thereby the reference level of the output detected signal is varied, the varied portion of the reference level is negatively fed back to the DC coupled inverting amplifier 14 through the DC feedback circuit 16 as the comparison output voltage, and as the result of the negative feedback, the DC operating point restores the preset value. Hence, the variation in the reference level of the output detected signal can be immediately compensated for. In this way, the DC operating point of the DC coupled inverting amplifier 14 is held at a constant value at all times and the stability of the DC operating point can be greatly improved.

The use of the above described AC amplifier 6 for amplification of the detected signal brings about the following advantages over the use of an ordinary AC amplifier for amplification of the detected signal.

First, the DC coupled inverting amplifier 14 can have its DC operating point maintained constant at all times by the DC negative feedback controlling function performed by the DC feedback circuit 16. Therefore, the stability of the DC operating point can be greatly improved and the reference level of the output detected signal can be maintained at a constant value.

Second, since the DC coupled inverting amplifier 14 has no separate bias supplying circuits therein, the DC coupled inverting amplifier 14 can be operated at high speed and with wide dynamic range. Further, since the DC coupled inverting amplifier 14 has no loop feedback circuits therein, it can obtain a high signal gain.

Third, the DC coupled inverting amplifier 14 is so arranged as to have the AC feedback circuit 15 and the DC feedback circuit 16 connected in parallel between the input and output thereof, the setting of the AC gain and frequency characteristic for the detected signal and the setting up for the stabilization of the DC operating point can be performed independently of each other.

Below will be described the overall operation of the present embodiment.

Such operations performed in the present embodiment that a rectangular driving pulse of negative polarity from a driving source (not shown) in a microcomputer or the like is supplied to the driving pulse supply terminal 12, the driving pulse is converted into a driving pulse of positive polarity in the inverter circuit 4, the driving pulse of positive polarity is clamped in the clamping circuit 3 such that its base value is clamped to the potential level obtained by subtracting the forward voltage drop Vf of the diode 10A from the first clamping potential (ground potential) and its peak value is clamped to the second clamping potential (emitter potential of the clamping voltage setting transistor 9), and that the light emitting diode 1, supplied with the clamped driving pulse, is driven only while the clamped driving pulse is applied thereto and, thereby, intermittent optical output power is generated from the light emitting diode 1 are the same as those performed in the first embodiment. Also, that the generating timing of the rectangular driving pulse of negative polarity is selected such that the light emitting timing of the light emitting diode 1 coincides with the approaching timing of a transported object (not shown) to the light emitting diode 1 is the same as in the first embodiment.

Further, the optical output power of the light emitting diode 1 is applied to the transported object and also supplied to the monitoring photodiode 5 disposed close to the light emitting diode 1. At this time, the monitoring photodiode 5 generates a detected signal whose amplitude is corespondent to the value of the optical output power supplied from the light emitting diode 1, which is also the same as in the first embodiment.

Then, the detected signal is supplied, through the buffer amplifier 13 having a high input impedance characteristic and a coupling capacitor for eliminating detected components of external disturbing light having a direct-current nature such as sunbeams, to the AC amplifier 6 and amplified to a predetermined level in the AC amplifier 6. In this case, the AC amplifier 6 formed of the DC coupled inverting amplifier 14, the AC feedback circuit 15, and the DC feedback circuit 16 is controlled so that its DC operating point is maintained constant at all times by the DC feedback action of the DC feedback circuit 16 and, thereby, the reference level of the output detected signal can be maintained constant at all times. Accordingly, even when the duty cycle of the detected signal is small or the DC component of the detected signal varies, the reference level of the output detected signal can be maintained constant at all times so that the DC component of the output detected signal does not vary. Further, the AC amplifier 6 can be operated at high speed and with wide dynamic range as described above, it is able to satisfactorily cope with the variations in the detected signal. Furthermore, since a high signal gain can be set up in the AC amplifier 6 independently, the detected signal can be effectively amplified to a desired level.

The output detected signal obtained at the output terminal of the AC amplifier 6 is supplied to the detector circuit 20 as a shaping circuit and converted therein into a DC voltage whose value is proportional to the amplitude of one of the polarities of the output detected signal. This DC voltage is then supplied to the noninverting input terminal of the operational amplifier 11 in the comparison circuit 8. In the comparison circuit 8, as described in the first embodiment, the DC voltage input thereto is integrated by means of the operational amplifier 11 and the parallel connection of the resistor and capacitor inserted in its negative feedback circuit and, thereby, an average DC voltage proportional to the average value of the DC voltage is obtained, and this average DC voltage is compared for voltage with the reference voltage $V_2$ from the reference power supply 7 supplied to the inverting input terminal of the operational amplifier 11 and thus the difference voltage between the average DC voltage and the reference voltage is obtained at the output of the operational amplifier 11. This difference voltage is then supplied to the base of the clamping voltage setting transistor 9 so that the second clamping voltage generated at the emitter of the clamping voltage setting transistor 9 is changed.

Also in this embodiment, when the value of the optical output power from the light emitting diode 1 has become lower than the normal set value and the amplitude of the detected signal has become smaller than the normal value, the second clamping voltage is controlled to become higher and, consequently, the peak value of the clamped driving pulse is raised and the value of the optical output power of the light emitting diode 1 is increased. On the other hand, when the value of the optical output power from the light emitting diode 1 has become higher than the normal set value and the amplitude of the detected signal has become larger than the normal value, the clamping voltage is controlled to become lower and, consequently, the peak value of the clamped driving pulse is lowered and the value of the optical output power of the light emitting diode 1 is decreased. By such sequences of controlling operations, the value of the optical output power of the light emitting diode 1 is automatically regulated to be maintained constant at all times.

As described above, the present embodiment provides such meritorious effects, in addition to those obtained in the first embodiment, that the DC operating point of the DC coupled inverting amplifier 14 can be stabilized and that the reference level of the output detected signal is maintained constant at all times.

The present embodiment, when the detected signal has its duty cycle close to 50%, provides such a meritorious effect, other than those mentioned above, that a wide dynamic range is obtained. However, when a detected signal with a small duty cycle is obtained or in the case where the DC component of the detected signal considerably varies with time, for example when a detected signal with a varying duty ratio is obtained, or when a detected signal with a varying period is obtained, it becomes impossible to compensate for the variation in the DC operating point of the DC coupled inverting amplifier 14 in an instant and, thus, the above described meritorious effects become not always obtainable.

Figure 4:
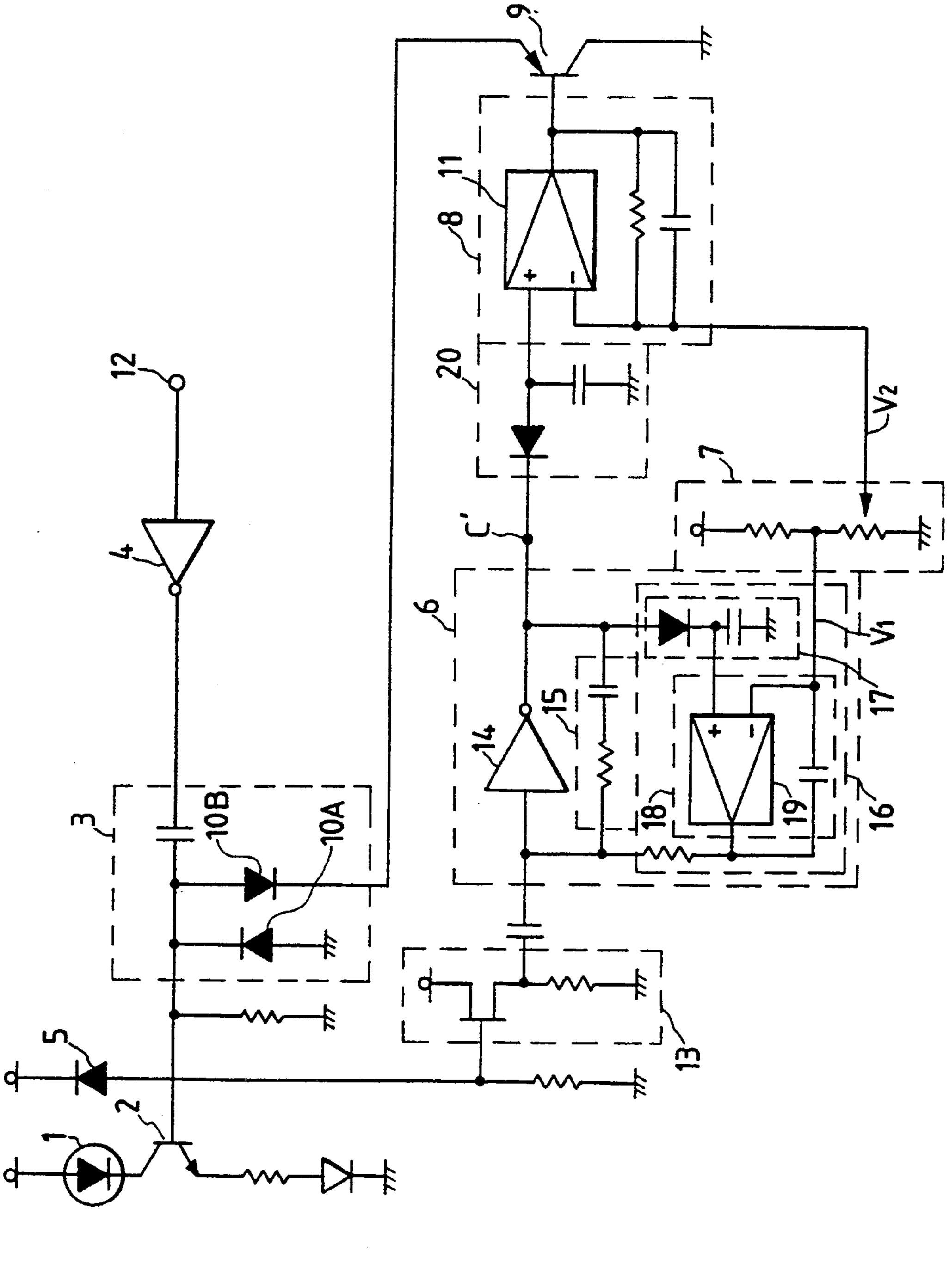
FIG. 4 is a circuit block diagram showing a third embodiment of the light emitting diode driving circuit according to the present invention.

FIG. 4 is a circuit block diagram showing a third embodiment of the light emitting diode driving circuit according to the present invention, which is designed to overcome the above described difficulty.

Also in FIG. 4, corresponding component parts to those shown in FIG. 3 are denoted by like reference numerals.

The point in which the present embodiment differs from the second embodiment in structure is only that, while a low-pass filter was used for the operating point extractor circuit 17 in the second embodiment, a peak hold circuit formed of a series diode and a shunt capacitor is used therefor in the present embodiment. Otherwise, there is no substantial difference in structure between the present embodiment and the second embodiment.

As to the operations, while, in the above described second embodiment, the DC component, inclusive of the extremely low frequency component, was extracted from the output detected signal and the extracted DC component was supplied to the noninverting input terminal of the operational amplifier 19 and, thereby, the controlling operation was performed such that the average value of the output detected signal is brought into agreement with the reference level, the present embodiment differs from it in that the peak value of positive polarity is extracted from the output detected signal by the operating point extractor circuit 17 formed of a peak hold circuit and the extracted peak value is supplied to the noninverting input terminal of the operational amplifier 19 and, with the peak level while the output detected signal is not supplied used as the reference level, the controlling operation is performed such that the peak value while the output detected signal is supplied becomes constant. Since, otherwise, there is virtually no difference between the operation in the present embodiment and the operation in the second embodiment, no morse detailed explanation as to the operation of the present embodiment will be given.

As to the meritorious effects, since the controlling operation is performed in the present embodiment, with the peak level while the output detected signal is not supplied used as the reference level, such that the peak value while the output detected signal is supplied becomes constant, such effects, in addition to the effects obtained in the second embodiment, can be obtained that the reference level of the output detected signal is substantially maintained constant and detection error of the output detected signal can be eliminated, even when the duty cycle of the input detected signal is small, or in the case where DC component of the detected signal varies considerably with time, for example when the duty ratio in the input detected signal varies, or when the period of the input detected signal varies.

In the present embodiment, the reference level of the output detected signal can be maintained at a substantially constant level irrespective of the duty cycle or the like of the detected signal. However, when the detected signal is such that includes ringing or noise, the DC operating point of the DC coupled inverting amplifier 14 is varied by the ringing or noise and, accordingly, the above described meritorious effects becomes not always obtainable.

Figure 5:
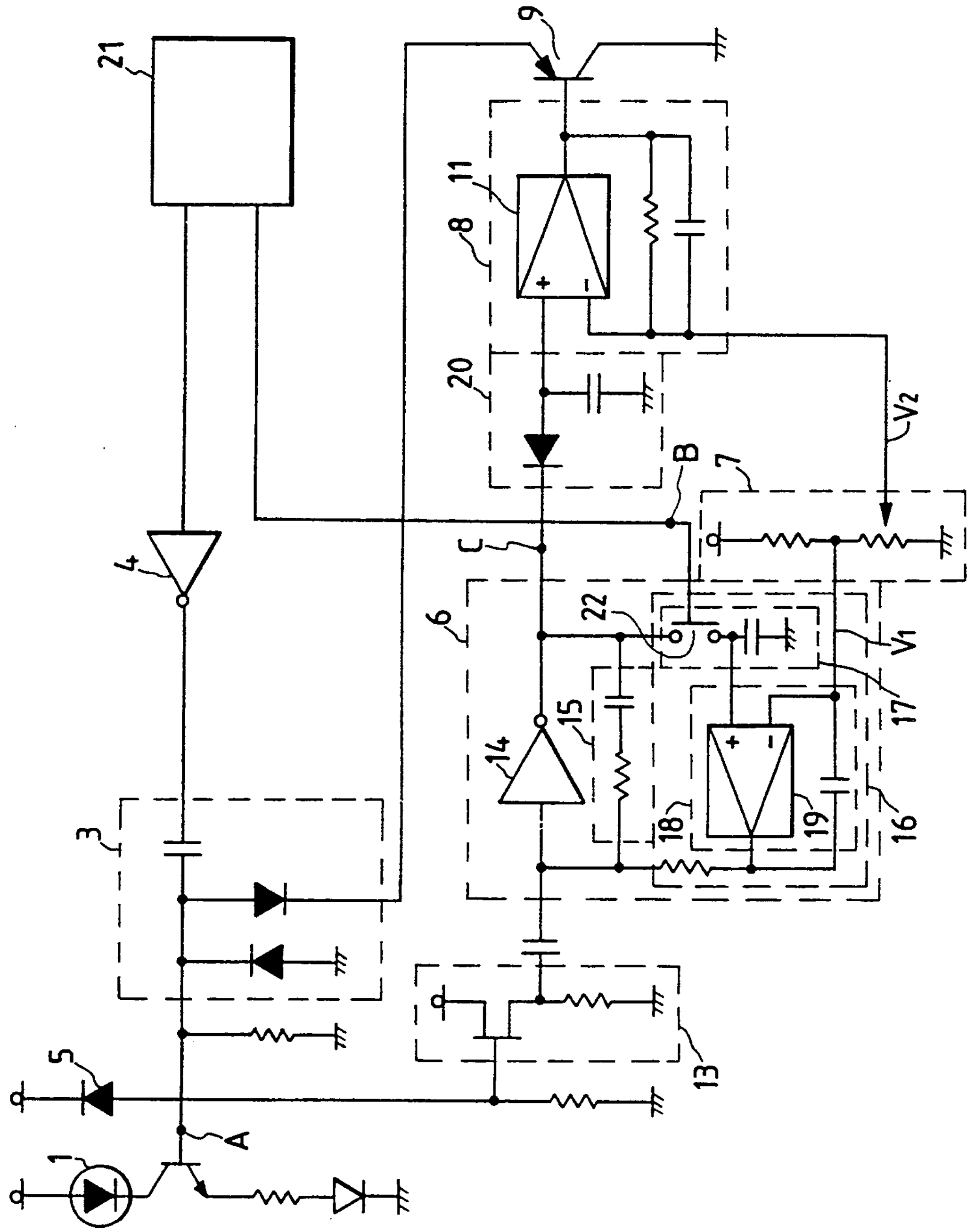
FIG. 5 is a circuit block diagram showing a fourth embodiment of the light emitting diode driving circuit according to the present invention.

FIG. 5 is a circuit block diagram showing a fourth embodiment of the light emitting diode driving circuit according to the present invention, which is designed to overcome the above described difficulty.

Referring to FIG. 5, reference numeral 21 denotes a timing signal generator circuit (drive source) and 22 denotes a first sampling switch. Otherwise, component parts corresponding to those in FIG. 4 are denoted by like reference numerals.

The points in which the present embodiment differs from the above described second embodiment and third embodiment are that a first sample and hold circuit formed of a first sampling switch 22 and a shunt capacitor is used for the operating point extractor circuit 17 in the present embodiment, while a low-pass filter circuit or a peak hold circuit was used therefor in the second embodiment, or third embodiment, and that the present embodiment has an on-off means for turning on and off the first sampling switch 22 with a first sampling pulse generated by the timing signal generator circuit 21, while no such means was provided for the second embodiment or third embodiment. Otherwise, there is no essential difference between the present embodiment and the above described second embodiment or third embodiment.

Figure 6:
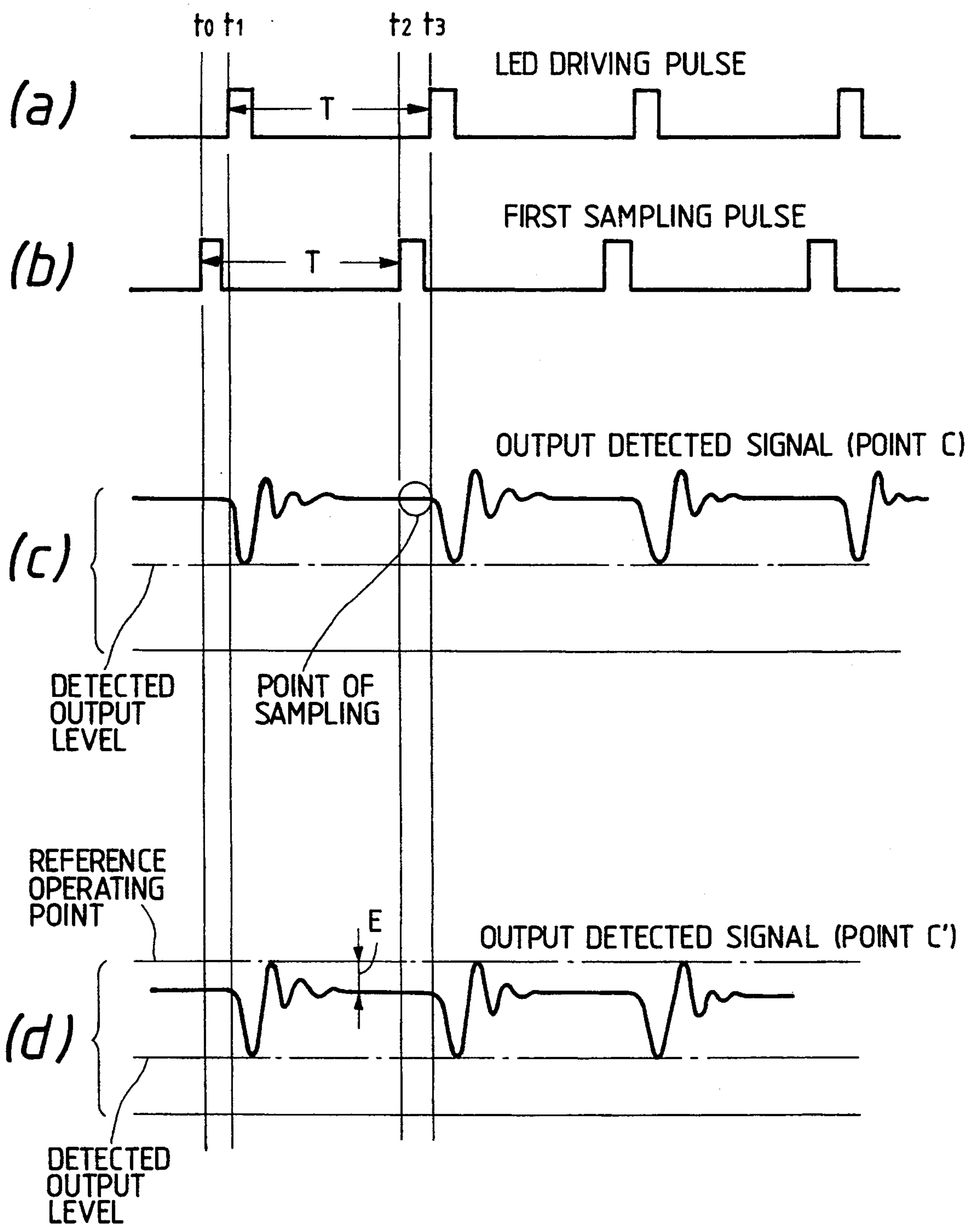
FIGS. 6*a*–6*d* are a signal waveform chart showing signals etc. at several parts in the embodiment of FIG. 5.

FIG. 6 is a signal waveform chart showing waveforms of signals used and processed in the present embodiment, of which FIG. 6(*a*) shows a LED driving pulse waveform (point A in FIG. 5), FIG. 6(*b*) shows a first sampling pulse waveform (point B in FIG. 5) for operating the first sampling switch 22, FIG. 6(*c*) shows an output detected signal waveform (point C in FIG. 5), and FIG. 6(*d*) shows an output detected signal waveform of the third embodiment (point C' in FIG. 4).

In this case, as shown in FIG. 6(*a*) and FIG. 6(*b*), the timing signal generator circuit 21 generates the LED driving pulse and the first sampling pulse with the same period T but generates the first sampling pulse at the point of time to slightly before the generated point of time $t_1$ of the LED driving pulse. The first sampling pulse switch 22 is turned on upon supply of the first sampling pulse thereto.

While the operation of the present embodiment is described with reference to the signal waveform chart of FIG. 6, other operations than are directly related to the operating point extractor circuit 17 of the AC amplifier 6 are substantially the same as those in the second embodiment and the third embodiment. Therefore, detailed description of such corresponding operations will be omitted here and the operation directly related to the operating point extractor circuit 17 will chiefly be described below.

When the first sampling pulse is supplied to the first sampling pulse switch 22 of the operating point extractor circuit 17 at the point of time $t_0$, the first sampling pulse switch 22 is turned on by the supply of the first sampling pulse. Since any detected signal has not yet been supplied to the AC amplifier 6 at this point of time, the reference level (base value) of the output detected signal is sampled and held in the operating point extractor circuit 17 and the held value is supplied to the noninverting input terminal of the operational amplifier 19. Then, in the operational amplifier 19, the held value and the reference voltage $V_1$ from the reference power supply 7 are compared for voltage and the comparison output voltage is supplied to the input terminal of the DC coupled inverting amplifier 14 through the feedback resistor connected in series. Thereby, a variation of the reference level (base value) of the output detected signal is compensated for and thus the DC operating point of the DC coupled inverting amplifier 14 is stabilized the same as in the above described second embodiment and third embodiment.

Then, at the point of time $t_1$, the LED driving pulse is supplied to the light emitting diode 1 and a resultant detected signal is applied to the AC amplifier 6. Then, the AC amplifier 6 amplifies the detected signal and generates an output detected signal. Since, at this time, the supply of the first sampling pulse has already been suspended and the first sampling pulse switch 22 is in its off state, any new sampling value is supplied to the operating point extractor circuit 17 but the held value previously output from the operating point extractor circuit 17 remains applied to the operational amplifier 19. Accordingly, when the AC amplifier 6 amplifies the detected signal, the amplification is performed with its DC operating point, or, more particularly, the DC operating point of the DC coupled inverting amplifier 14, stabilized.

Even if the detected signal is such that includes ringings as shown in FIG. 6(*c*), the ringings are only existent during a period immediately after the application of the detected signal, i.e., during a short period after the point of time $t_1$. Therefore, the ringings have already disappeared at the time immediately before the supply of the detected signal next time, i.e., the point of time $t_2$ when the next sampling pulse is supplied. Thus, at the time of sampling of the reference level (base value) of the output detected signal in the operating point extractor circuit 17, an accurate reference level of the output detected signal can be sampled and held. Further, even if the detected signal is such that it includes noise, the probability of noise occurring immediately before a signal detection period, i.e., at the time t2 when a sampling pulse is applied, is very small. Therefore, as with the case where ringings are included, an accurate reference level of the output detected signal can be sampled and held at the time of sampling of the reference level (base value) of the output detected signal in the operating point extractor circuit 17.

Incidentally, since the operating point extractor circuit 17 in the third embodiment was such that extracts the peak value of the reference level (base value) of the output detected signal, when the detected signal includes ringings, the DC operating point (reference operating point) of the DC coupled inverting amplifier 14 suffers a variation corresponding to the level E of the peak of the ringing as shown in FIG. 6(*d*).

According to the present embodiment as described above, since the sampling of the reference level (base value) of the output detected signal in the operating point extractor circuit 17 is performed while the ringings or noises are not supplied, such meritorious effects can be obtained, other than those obtained in the third embodiment, that, even when the detected signal includes ringings or noises, the DC operating point of the DC coupled inverting amplifier 14 is prevented from suffering a variation irrespective of existence of ringings or noises and the reference level of the output detected signal can be kept constant at all times.

When the light emitting diode driving circuit of the present embodiment is used in a photoelectric switch apparatus, it becomes necessary that a plurality of the light emitting diode driving circuits are arranged along a conveyer belt and these light emitting diode driving circuits are operated in parallel. In such parallel operation, a monitoring photodiode 5 can receive, in addition to the regular optical output power from the light emitting diode 1 confronting the same, optical output power from adjoining light emitting diodes. Thus, there arises a possibility that the detected signal include detected outputs from both the optical output power sources and, hence, the controlling operations of the light emitting diode driving circuits as a whole comes to be disturbed.

Figure 7:
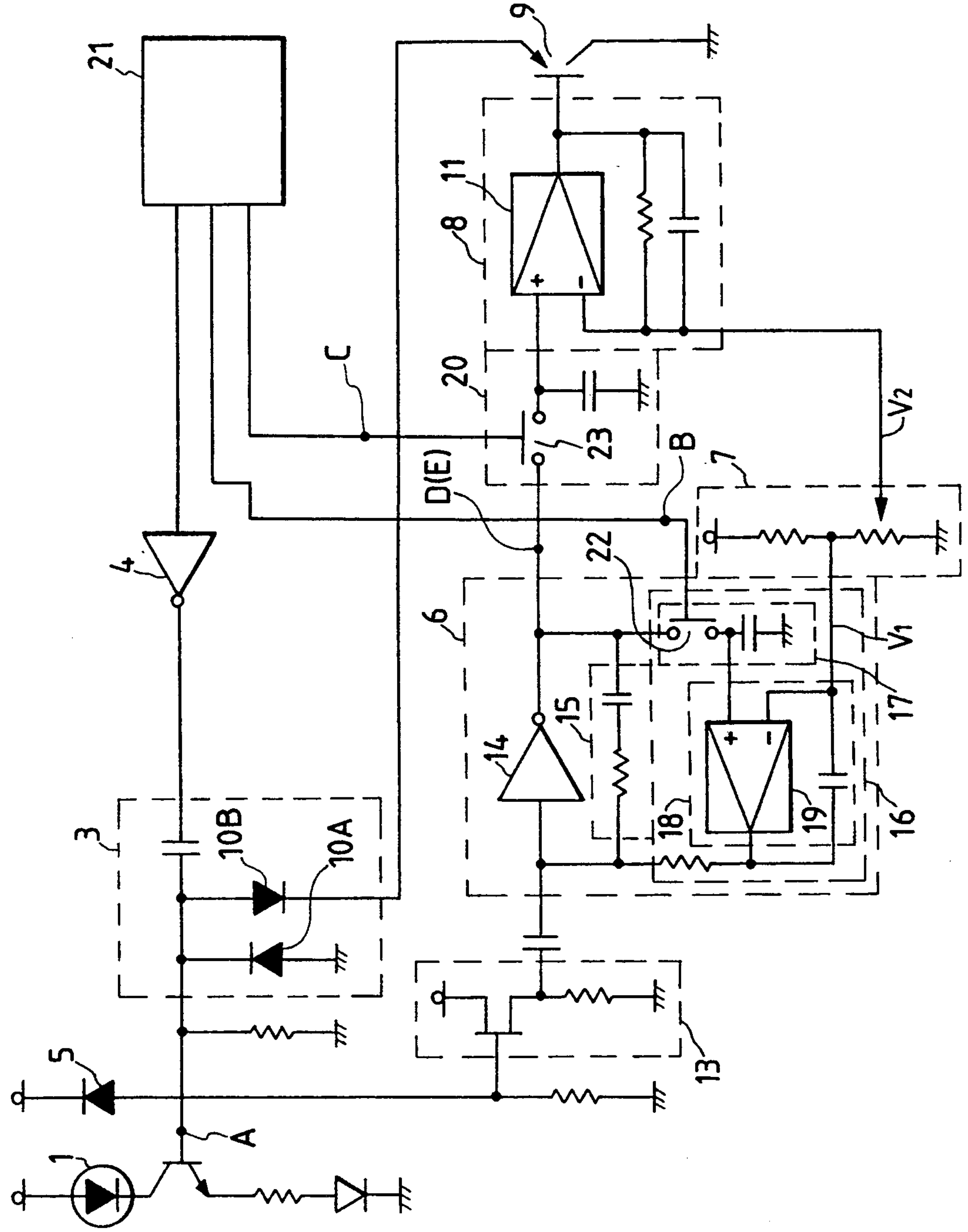
FIG. 7 is a circuit block diagram showing a fifth embodiment of the light emitting diode driving circuit according to the present invention.

FIG. 7 is a circuit block diagram showing a fifth embodiment of the light emitting diode driving circuit according to the present invention which is designed to overcome the above described difficulty.

Referring to FIG. 7, reference numeral 23 denotes a second sampling switch. Other component parts in FIG. 7 corresponding to those shown in FIG. 5 are denoted by like reference numerals.

The points in which the present embodiment differs from the fourth embodiment are that a second sample and hold circuit formed of the second sampling switch 23 and a shunt capacitor is used for the shaping circuit 20 in the present embodiment, while a detector circuit formed of a series diode and a shunt capacitor is used therefor in the fourth embodiment, and that the present embodiment includes an on/off means for turning on and off the second sampling switch 23 with a second sampling pulse generated by the timing signal generator circuit 21, while the fourth embodiment has no such means. Otherwise, there is no substantial difference between the present embodiment and the fourth embodiment.

Figure 8:
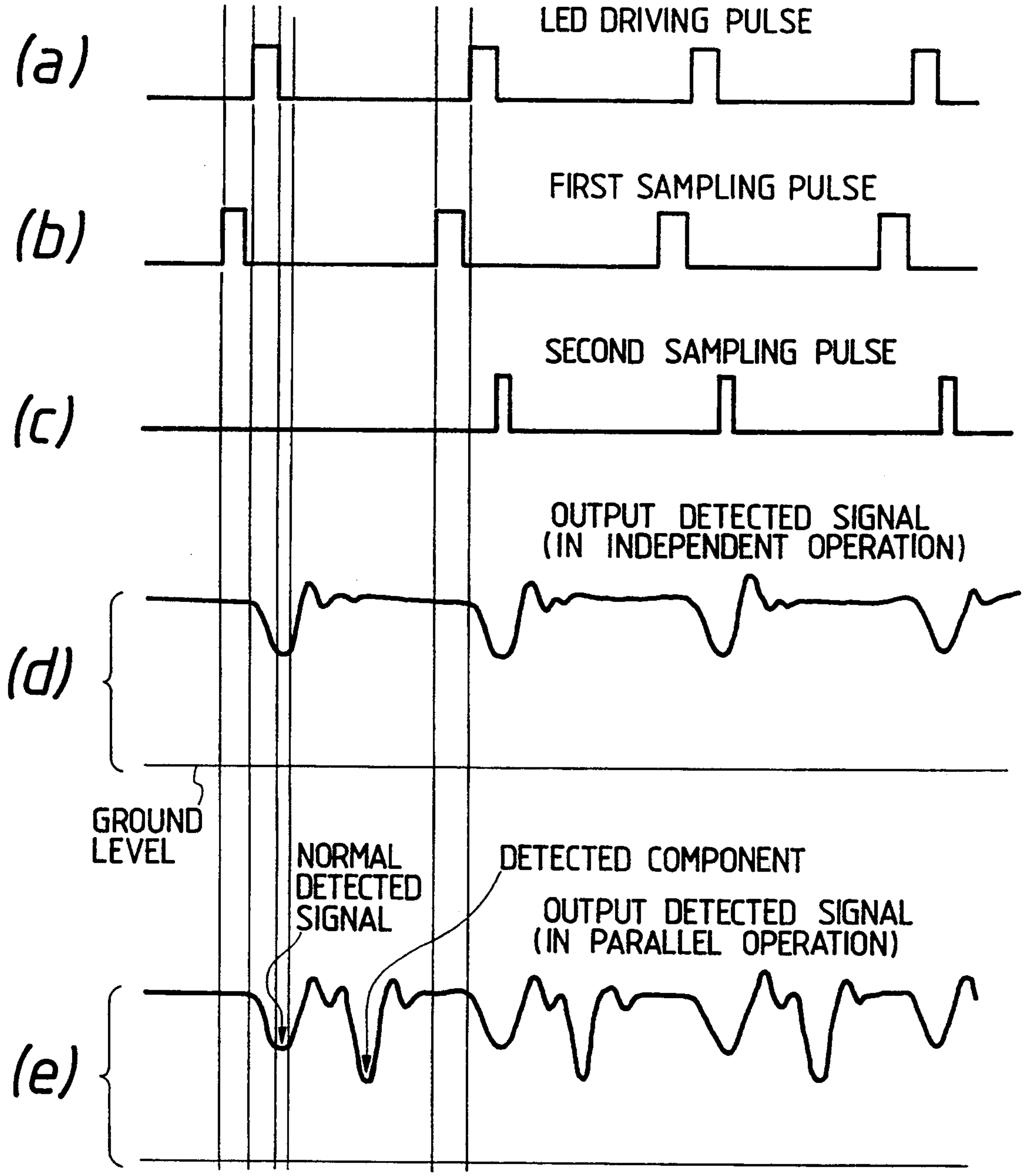
FIGS. 8*a*–8*e* are a signal waveform chart showing signals etc. at several parts in the embodiment of FIG. 7.
Figure 9:
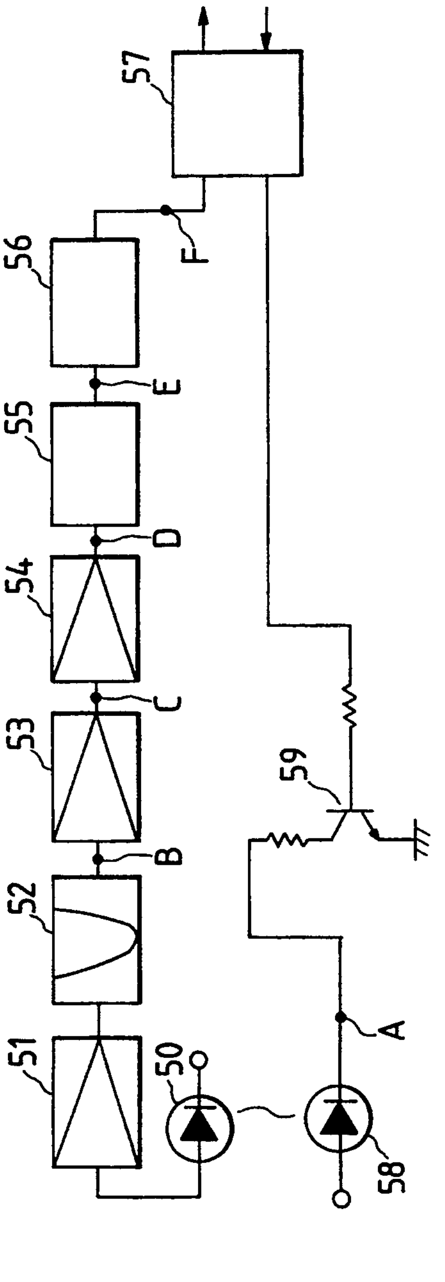
FIG. 9 PRIOR ART
FIG. 9 is a block diagram showing an example of a conventional photoelectric switch appratus.

FIG. 8 is a signal waveform chart showing waveforms of signals used and signals processed in the present embodiment, of which FIG. 8(*a*) shows a LED driving pulse waveform (point A in FIG. 7), FIG. 8(*b*) shows a first sampling pulse waveform (point B in FIG. 7) for actuating the first sampling switch 22, FIG. 8(*c*) is a second sampling pulse waveform (point C in FIG. 7) for actuating the second sampling switch 23, FIG. 8(*d*) is an output detected signal waveform (point D in FIG. 7), and FIG. 8(*e*) is an output detected signal waveform (point E in FIG. 7) when light emitting diode driving circuits are operated in parallel.

In this case, the timing signal generator circuit 21 generates the LED driving pulse, the first sampling pulse, and the second sampling pulse with the same period T as shown in FIG. 8(*a*) to FIG. 8(*c*), but the first sampling pulse is generated at a point of time to a little before a point of time $t_1$ of the generation of the LED driving pulse and the second sampling pulse is generated at a point of time $t_2$ a little after the point of time $t_1$ of the generation of the LED driving pulse. The first and second sampling pulse switches 22 and 23 are actuated upon supply thereto of the first and second sampling pulses, respectively.

While the operation of the present embodiment is described with reference to the signal waveform chart of FIG. 8, since other operations than that directly related to the shaping circuit 20 are virtually the same as those in the fourth embodiment, detailed description of such corresponding operations will be omitted here. The operation directly related to the shaping circuit 20 will chiefly be described below. However, some duplicate description of a part of the operations that are related to the operating point extractor circuit 17 and others will be given to clarify the relationship of the operation with the points of time at which the first and second sampling pulses are supplied.

First, when the first sampling pulse as shown in FIG. 8(*b*) is supplied to the first sampling pulse switch 22 of the operating point extractor circuit 17 at the point of time $t_0$, the first sampling pulse switch 22 is turned on. Since a detected signal has not yet been supplied to the AC amplifier 6 at this point of time, the reference level (base value) of the output detected signal is sampled and held in the operating point detector circuit 17 and the held value is applied to the noninverting input terminal of the operational amplifier 19. In the operational amplifier 19, the held value and the reference voltage $V_1$ of the reference power supply 7 are compared for voltage and the comparison output voltage is supplied to the input terminal of the DC coupled inverting amplifier 14 through the series feedback resistor and, thereby, a variation of the reference level (base value) of the output detected signal is compensated for. Thus, the same as in the fourth embodiment, the DC operating point of the DC coupled inverting amplifier 14 can be stabilized.

When the LED driving pulse as shown in FIG. 8(*a*) is supplied to the light emitting diode 1 at the point of time $t_1$ and, thereupon, a detected signal is applied to the AC amplifier 6, the AC amplifier 6 amplifies the detected signal and generates an output detected signal as shown in FIG. 8(*d*). At this point of time, however, the supply of the first sampling pulse has already been suspended and the first sampling pulse switch 22 is in its off state, and therefore, any new sampling value is not supplied to the operating point detector circuit 17 and the held value output from the operating point detector circuit 17 remains applied to the operational amplifier 19. Accordingly, when the AC amplifier 6 amplifies the detected signal, the amplification is performed with the DC operating point of the DC coupled inverting amplifier 14 in a stabilized state, which is also the same as in the fourth embodiment.

Then, the output detected signal is supplied to the shaping circuit 20 constituted of a second sample and hold circuit. The timing of the supply is a little delayed from the point of time ti as shown in FIG. 8(*d*), i.e., its peak arrives at the point of time $t_2$.

When the second sampling pulse as shown in FIG. 8(*c*) is applied to the second sampling switch 23 of the shaping circuit 20 at the point of time $t_2$, the second sampling switch 23 is brought to its on state. Since the peak of the output detected signal is arrived there at the point of time $t_2$, the peak value of the output detected signal is sampled and held in the shaping circuit 20 constituted of the second sample and hold circuit. The held value is applied to the operational amplifier 11 of the comparison circuit 8 in the following stage and comparison for voltage of it with the reference voltage $V_2$ is performed in the operational amplifier 11 the same as before.

At this time, even if the output detected signal is a signal obtained in the parallel operation of the light emitting diode driving circuits and having such a waveform as shown in FIG. 8(*e*), since the shaping circuit 20 is adapted to sample and hold the peak value of the output detected signal only a short period during which the second sampling pulse is supplied thereto, the detected component of the optical output power from the adjoining light emitting diode included in the output detected signal, if any, will not be sampled and held in the shaping circuit 20. Therefore, even if the level of the detected component is higher than the level of the normal detected signal, the detected signal does not have an effect on the circuits subsequent to the comparison circuit 8. Thus, the controlling operation of the light emitting diode driving circuit is not disturbed by the existence of such detected component.

Here in the present embodiment, a pulse signal whose pulse width is 1 μ sec and repetition period is 20 μ sec, for example, is used as the LED driving pulse and, that having a pulse width of 500 nsec and a repetition period of 20 μ sec, for example, is used as the first and second sampling pulses. Further, the interval between the rise of the first sampling pulse and the fall of the second sampling pulse is selected to be for example 1.5 μ sec.

According to the present embodiment as described above, since it is arranged such that only the peak value of the output detected signal is sampled and held in the shaping circuit 20, such meritorious effects can be obtained, other than those obtained in the fourth embodiment, that, even if the output detected signal includes the detected component corresponding to the optical output power from the adjoining light emitting diode in addition to the detected signal corresponding to the normal optical output power, the detected component other than the detected signal corresponding to the normal optical output power is eliminated in the shaping circuit 20 and, hence, the controlling operation of the light emitting diode driving circuit as a whole is not disturbed by the detected component.

In each of the embodiments described above, the type in which clamping diodes 10A and 10B in shunt connection are used has been described to be used for the clamping circuit 3. The clamping circuit 3 in the present invention is not limited to that of the described arrangement but may be suitably changed.

In the above described second to fifth embodiments, the DC coupled inverting amplifier 14 formed of three transistor amplification stages has been used as an example, but the DC coupled inverting amplifier 14 in the present invention is not limited to the described arrangement, but it may be such that is formed of one transistor amplification stage, or that is formed of a CMOS inverter gate or a bipolar inverter gate.

Also, as to the low-pass filter circuit, the peak hold circuit, and the sample and hold circuit constituting the operating point extractor circuit 17, and as to the detector circuit and the sample and hold circuit constituting the shaping circuit 20, the present invention is not limited to the types of circuits mentioned in the above described embodiments but any other circuits achieving like performances can be used.

As described in the foregoing, according to one aspect of the present invention even if the value of the optical output power of the light emitting diode has varied on account of age deterioration, change in the characteristics due to temperature variation, or the like, it is arranged such that the variation in the value of the optical output power is detected and the clamping voltage of the clamping circuit is controlled in accordance with such a variation. Therefore, the variation in the optical output power is canceled and it is attained to have a constant value of the optical output power generated by the light emitting diode at all times.

Other than the above, according to another aspect of the present invention since it is made possible to have a constant value of the optical output power generated from the light emitting diode at all times, by applying the light emitting diode driving circuit to such an apparatus as a photoelectric switch apparatus for detecting a transported object, presence or absence of the transported object can be accurately detected independently of variations in environmental conditions.

According to another aspect of the present invention a meritorious effect can be obtained, other than the effects obtained from the invention set forth in the above-mentioned aspects that the DC operating point of the AC amplifier for amplifying the detected signal corresponding to the variation in the value of the optical output power can be stabilized and the reference level of the output detected signal can be kept constant at all times.

What is claimed is:

1. A light emitting diode driving circuit for supplying a driving pulse from a drive power source to a light emitting diode to thereby cause the light emitting diode to emit light intermittently, the driving circuit comprising:

a clamping circuit connected between said drive power source and said light emitting diode, said clamping circuit including a diode having an anode connected to the drive power source and a cathode;

a photodiode disposed in the vicinity of said light emitting diode for detecting the optical output power of said light emitting diode and for generating a detected output signal;

a comparison circuit for comparing the detected output signal from said photodiode and a reference voltage, and for generating an output signal determined by a difference between the detected output signal and the reference voltage; and a transistor having an emitter connected to the cathode of the diode, a base connected to receive the output signal from the comparison circuit, and a collector connected to ground;

wherein a clamping voltage of said clamping circuit is controlled by the output signal of said comparison circuit by adjusting a resistance of the transistor in response to the output signal of said comparison circuit such that the optical output power of said light emitting diode is kept constant.

2. A light emitting diode driving circuit for supplying a driving pulse from a drive power source to a light emitting diode to thereby cause the light emitting diode to emit light intermittently, the driving circuit comprising:

a clamping circuit connected between said drive power source and said light emitting diode, said clamping circuit including a diode having an anode connected to the drive power source and a cathode;

a photodiode disposed in the vicinity of said light emitting diode for detecting the optical output power of said light emitting diode and for generating a detected output signal;

an AC amplifier having a DC operating point stabilized by means of a DC feedback circuit for AC, the AC amplifier amplifying the detected output signal from said photodiode;

a shaping circuit for shaping the output amplified signal from said AC amplifier;

a comparison circuit for comparing the output shaped signal from said shaping circuit and a reference voltage, and for generating an output signal determined by a difference between the detected output signal and the reference voltage; and a transistor having an emitter connected to the cathode of the diode, a base connected to receive the output signal from the comparison circuit, and a collector connected to ground;

wherein a clamping voltage of said clamping circuit is controlled by the output signal of said comparison circuit by adjusting a resistance of the transistor in response to the output signal of said comparison circuit such that the optical output power of said light emitting diode is kept constant.

3. A light emitting diode driving circuit according to claim 2, wherein said DC feedback circuit of said AC amplifier includes an operating point extractor circuit and a voltage comparator for comparing the extracted output from said operating point extractor circuit and said reference voltage.

4. A light emitting diode driving circuit according to claim 3, wherein said operating point extractor circuit is a low-pass filter.

5. A light emitting diode driving circuit according to claim 2, wherein said shaping circuit is a detector circuit.

6. A light emitting diode driving circuit according to claim 3, wherein said shaping circuit is a peak hold circuit.

7. A light emitting diode driving circuit according to claim 3, wherein said shaping circuit is a sample and hold circuit.

8. A light emitting diode driving circuit according to claim 2, wherein said shaping circuit is a sample and hold circuit.

9. A light emitting diode driving circuit according to claim 1, wherein the clamping circuit further comprising a second diode having a cathode connected to the drive power source and an anode connected to ground.

10. A light emitting diode driving circuit according to claim 2, wherein the clamping circuit further comprising a second diode having a cathode connected to the drive power source and an anode connected to ground.

* * * * *